United States Patent [19]

Alberty

[11] Patent Number: 5,453,204
[45] Date of Patent: Sep. 26, 1995

[54] TREATMENT OF HYDROLYZER SYSTEMS IN PROPYLENE OXIDE PRODUCTION

[76] Inventor: John R. Alberty, 212 University Highland Ct., Baton Rouge, La. 70808

[21] Appl. No.: 275,844

[22] Filed: Jul. 15, 1994

[51] Int. Cl.$^6$ .................................................. C02F 5/10
[52] U.S. Cl. .......................................... 210/701; 549/522
[58] Field of Search ............................. 210/701; 549/522

[56] References Cited

U.S. PATENT DOCUMENTS

| | | | |
|---|---|---|---|
| 3,247,227 | 4/1966 | White | 549/522 |
| 3,514,376 | 6/1970 | Salutsky | 203/7 |
| 3,886,187 | 5/1975 | Bartholomé et al. | 549/522 |
| 4,029,577 | 6/1977 | Godlewski et al. | 210/58 |
| 4,046,707 | 9/1977 | Smith et al. | 252/180 |
| 4,701,262 | 10/1987 | Chen | 210/699 |
| 4,925,568 | 5/1990 | Morse | 210/701 |
| 5,160,630 | 11/1992 | Clubley et al. | 210/699 |

FOREIGN PATENT DOCUMENTS

| | | | |
|---|---|---|---|
| 721287 | 11/1965 | Canada | 549/522 |
| 225082 | 12/1983 | Japan | 549/522 |
| 1242041 | 8/1971 | United Kingdom | 549/522 |

OTHER PUBLICATIONS

ACUMER™ water treatment polymers brochure, "ACUMER™ 2000 Anti-Scale Deposition Polymer For all-Organic Cooling Water Treatment", Copyright 1990, Rohm and Haas Company (14 pages).

ACUMER™ water treatment polymers brochure, "ACUMER™ 1000 ACUMER™ 1020 ACUMER™ 1100 ACUMER™ 9300 Scale Inhibitors", Copyright 1993, Rohm and Haas Company (22 pages).

Betz, *Handbook of Industrial Water Conditioning* Eighth Edition, 1980, pp. 197–197.

*Primary Examiner*—Neil McCarthy
*Attorney, Agent, or Firm*—Robert C. Tucker; William David Kiesel

[57] ABSTRACT

Production of propylene oxide by hydrolysis of propylene chlorohydrin in an aqueous alkaline reaction medium having a pH above 12 and a temperature of at least about 85° C., is conducted in the presence of a small scale-inhibiting amount of a scale inhibitor added as a water-soluble polymer of acrylic acid having a weight average molecular weight in the range of about 1000 to about 5000, and in the absence of any phosphorus-containing additive component. A significant increase in acrylic polymer performance occurs under these high pH conditions as compared to performance at lower pH. Moreover, experiments have shown that no scale deposits were formed in a hydrolyzer unit operated for 180 days under conditions which normally require removal of deposits after 90 days of operation.

25 Claims, 1 Drawing Sheet

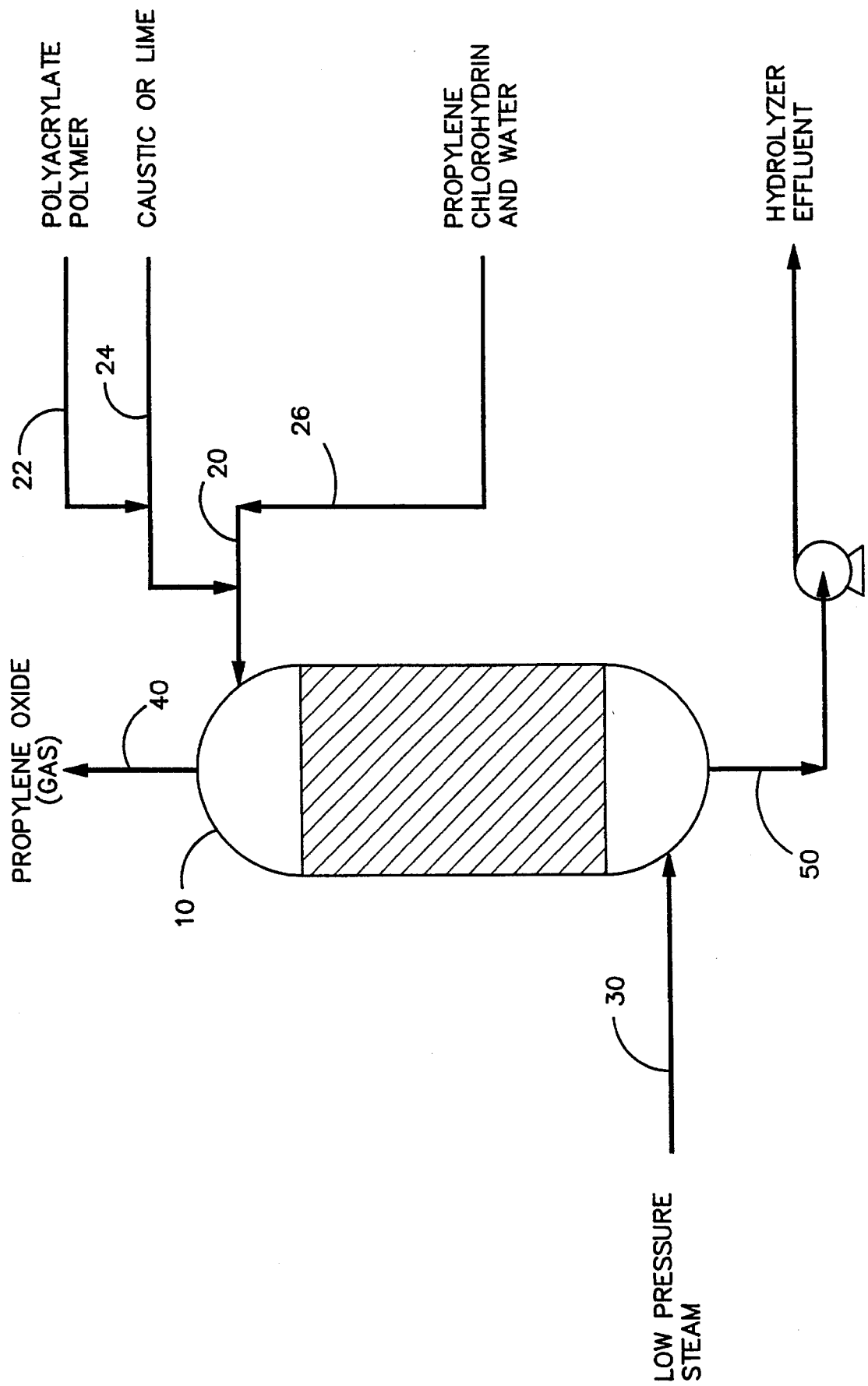

TREATMENT OF HYDROLYZER SYSTEMS IN PROPYLENE OXIDE PRODUCTION

TECHNICAL FIELD

This invention relates to the chlorohydrin process for the manufacture of propylene oxide. More particularly, this invention relates to treatment of the hydrolyzer systems used in the epoxidation stage of the chlorohydrin process.

BACKGROUND

The chlorohydrin process for production of propylene oxide involves, in essence, a two-stage process. In the first stage, propylene chlorohydrin is formed from propylene and chlorine in excess water. The resulting dilute solution is then subjected in the second stage to treatment with a base such as lime or caustic soda in a hydrolyzer system to produce crude propylene oxide and an effluent water stream containing calcium chloride or sodium chloride. An excess of water is used in the first stage reaction in order to minimize by-product propylene dichloride and ether formation. Thus in practice, a relatively large throughput of water is involved in the overall process, and this necessitates treatment and disposal of a relatively large quantity of water effluent.

The majority of aqueous systems, in general, contain dissolved salts which may be converted to insoluble salts and deposited as scale on surfaces in contact with the water or aqueous system. If the system is at elevated pH and/or elevated temperature, the problem of scale formation can be magnified by the precipitation of soluble salts. In the chlorohydrin process, temperatures above 85° C. and pH above 12 are required for optimum yields. Therefore, the process water which acts as a carrier for chlorohydrin and propylene must either be pretreated to remove or reduce calcium to eliminate potential scaling, or treated with scale inhibitors to reduce or eliminate scale formation. Pretreatment with zeolite units or with reverse osmosis units has been successful in removing calcium from the process water, but such units are expensive to install and operate. Prior attempts to include blends of polymer (including polyacrylates) and phosphonates have proved partially successful, and in practice it has been deemed necessary to use the combination of the polymer with the phosphonates despite the fact that the resultant phosphorus content in the effluent water is an undesirable constituent from an environmental standpoint.

SUMMARY OF THE INVENTION

It has now been discovered that, contrary to conventional wisdom in the art, in an operation wherein propylene oxide is produced by the chlorohydrin process, use of certain polyacrylate polymers in the aqueous feed stream to the propylene chlorohydrin hydrolyzer unit is superior to the use of combinations of polyacrylates and phosphonates. In fact, by using a feed stream treated pursuant to this invention, it has been found possible to operate a propylene chlorohydrin hydrolyzer for an extended period of time (e.g., 180 days) without formation of any visible scale formation. Normally after operation under the same reaction conditions with process water containing the combination of a polyacrylate polymer and a phosphonate, the hydrolyzer unit had to be shut down after 90 days of operation in order to clean out scale and deposits that had formed therein.

Accordingly, this invention provides, inter alia, a process which comprises introducing into an alkaline aqueous reaction mixture being fed to a reaction zone wherein propylene chlorohydrin is subjected to hydrolysis (or epoxidation) to produce propylene oxide, a small scale-inhibiting amount of a water-soluble polymer of acrylic acid having a weight average molecular weight in the range of about 1000 to about 5000, and maintaining the reaction mixture within said unit free of any phosphorus-containing component.

THE DRAWING

FIG. 1 is a schematic representation of the hydrolyzer section of a propylene oxide plant wherein propylene chlorohydrin is converted to propylene oxide in an alkaline aqueous medium.

FURTHER DESCRIPTION OF THE INVENTION

Overview of the Chlorohydrin Process

The first stage of the chlorohydrin process typically involves mixing the propylene and chlorine in approximately equal molar amounts in an excess amount of water over that required to form the propylene chlorohydrin, presumably by reaction with an intermediate reaction product such as a propylene-chloronium complex. Hydrogen chloride is formed as co-product. Usually the proportions used are-such that there are approximately 4 to 8 mols of water per mol of propylene. While the details of commercial operations are maintained as trade secrets, it has been reported (Kirk-Othmer, *Encyclopedia of Chemical Technology*, Third Edition, Volume 19, copyright 1982 by John Wiley & Sons, Inc., page 254) that the propylene-to-chlorine ratio must be closely controlled to avoid an explosive reaction between the hydrocarbon and chlorine. The same source indicates that reaction temperature is in the range of 40°–90° C.; that depending on the water-to-chlorine ratio, the exothermic chlorohydrination reaction raises the temperature by 10°–40° C.; and that the reaction pressures are about atmospheric or slightly above.

In the second stage of the process, the chlorohydrin is treated with an excess of the base (e.g., lime or caustic soda) relative to the mount of chlorohydrin and hydrogen chloride present. Here again process details of commercial operations are maintained as trade secrets. However, according to published sources (e.g., Japanese 73-34,809 to K. Suzuki et al. of Asahi Glass Co. Ltd. and A. C. Fyvie, *Chem. Ind. London*, 1964, Volume 10, at page 385), the excess alkalinity is approximately 10% based on the mount of chlorohydrin and hydrogen chloride. As noted above, the temperature in the hydrolyzer is normally above 85° C. and the pH is above 12.

It will be understood and appreciated that this invention is not limited to any given set of process conditions in the overall chlorohydrin process for producing propylene oxide. The important thing is that the phosphorus additive-free aqueous mixture entering the hydrolyzer wherein the propylene oxide is formed is or has been treated such that it contains a small scale-inhibiting amount of the above water-soluble acrylic acid polymer and/or salt thereof such that formation of scale deposits in the hydrolyzer are minimized or eliminated.

Treating Agents

The acrylic scale deposit inhibitors used in the practice of this invention are acrylic acid polymers having weight average molecular weights (as determined by aqueous gel permeation chromatography) in the range of about 1000 to about 5000, and their water-soluble salts. Preferred treating agents of this invention are acrylic acid polymers in which the weight average molecular weight is in the range of about 1800 to about 2200, and their water-soluble salts. The water-soluble salts may be fully or partially neutralized forms of the polymers. Of the water-soluble salts, the sodium salts are preferred. The most advantageous polymers are the polyacrylic acids and sodium salts thereof wherein the acid has an aqueous GPC weight average molecular weight of about 2000. The acrylic acid polymers can be water-soluble homopolymers or copolymers containing a major proportion (on a molar basis) of acrylic acid. Polymers of these types are available commercially, for example from Rohm and Haas Company under the ACUMER trademark.

It will be understood from the foregoing that as used herein, the molecular weights of water-soluble salts of the acrylic acid polymers are given in terms of the molecular weights of the polymers in their acid (completely unneutralized) form. Likewise, unless otherwise specified, the term "acrylic acid polymer", whether singular or plural, encompasses (a) water-soluble acrylic acid homopolymers, (b) acrylic acid copolymers having an average of 50 mol % or more of acrylic acid in the polymer chains, and (c) the total or partial water-soluble salts of such homopolymers and copolymers. The term "water-soluble" in turn means that at least 3 ppm (wt) of the acrylic acid polymer can be dissolved in pure water held at a temperature of 20° C.

The acrylic acid polymer is used in an amount sufficient to inhibit scale formation in the hydrolyzer (epoxidation) unit. Generally speaking, this amount will fall in the range of about 3 to about 50 ppm (wt), and preferably is in the range of about 3 to about 30 ppm (wt). However, departures from these ranges may be resorted to whenever deemed necessary or desirable in any given situation.

Other water-soluble additive components may be utilized in conjunction with the acrylate polymer provided such other additives are devoid of phosphorus and do not materially interfere with the hydrolysis reaction in which propylene chlorohydrin is transformed into propylene oxide. Examples of other additives that may be used include water-soluble azole corrosion inhibitors; water-soluble inorganic chromate or molybdate salts; water-soluble sequestering agents such as nitrilotriacetic acid and its salts, and ethylene diamine tetraacetic acid and its salts; and like suitable materials. Preferably, however, one or more water-soluble acrylic acid polymers and/or salts thereof are used as the sole additive complement used in the hydrolysis mixture in the hydrolyzer system.

The Hydrolyzer System

FIG. 1 depicts schematically a typical hydrolyzer section of a propylene oxide plant. In the system depicted, the hydrolysis mixture is fed by line 20 into the upper portion of hydrolyzer 10 and steam is introduced into a lower portion of the hydrolyzer via line 30. Crude propylene oxide formed within hydrolyzer 10 is taken off overhead in the vapor state via line 40. The remainder of the liquid reaction mixture is removed from the hydrolyzer via line 50 as an effluent stream.

In the system depicted, acrylic acid polymer is fed by line 22 into an alkaline solution, typically lime or caustic soda, delivered by line 24. The resultant mixture in line 24 is in turn fed into line 20 into which has been delivered an aqueous mixture of propylene chlorohydrin via line 26. Thus the feed in line 20 as it enters hydrolyzer 10 in the particular system depicted is comprised of an aqueous alkaline mixture of propylene chlorohydrin, inorganic base and the water-soluble acrylic acid polymer which at this stage is predominately if not entirely in salt form. As noted above, the hydrolysis reaction mixture in hydrolyzer 10 is typically at a temperature above about 85° C. and a pH above 12. In a typical overall plant, the propylene chlorohydrin is produced in a first stage section (not depicted) for delivery to the hydrolysis system such as here depicted, via line 26. Likewise, in a typical plant the crude propylene oxide vapor from the hydrolysis (epoxidation) reactor (hydrolyzer 10) is transported as by line 40 to a purification section (not shown) wherein small amounts of impurities are removed from the product. The effluent in line 50 may be further treated before discharge.

It will be understood and appreciated that the acrylic acid polymer may be fed to the hydrolysis reaction in any suitable manner, for example as a separate feed directly into the reactor. Alternatively, the acrylic acid polymer may be added to the reaction mixture by addition to the propylene chlorohydrin feed in line 26. These and other suitable modes of addition, which may now occur to those skilled in the art, are within the purview of this invention.

In one of its embodiments, therefore, this invention provides an improvement in the chlorohydrin process for the production of propylene oxide wherein propylene chlorohydrin is reacted with lime or caustic in an aqueous system. The improvement comprises inhibiting scale formation salts in the chlorohydrin hydrolyzer unit by introducing into the hydrolyzer unit a small scale-inhibiting amount of a water-soluble polymer of acrylic acid having a weight average molecular weight in the range of about 1000 to about 5000, and maintaining the reaction system within said unit free of any phosphorus-containing component. The preferred addition point of the polymer is the alkaline stream entering the hydrolyzer, but as noted above, other points of addition may be successful. Performance can be materially enhanced by maintaining the polymer at or above a temperature of about 50° F. as it is being fed to the process stream, as in line 22.

Inasmuch as the process water is devoid of any added phosphorus additive, the effluent water from the process is phosphorus-free and thus requires no special post-treatment to remove phosphorus impurities in situations where legislation requires low or no phosphorus in discharge water.

The following examples illustrate the practice and additional advantages of this invention.

EXAMPLE I

A series of experiments was conducted in which the effectiveness of a typical acrylic acid polymer under different pH conditions was investigated. These experiments involved determining the amount of calcium that could kept in solution in the presence of a constant treatment level of the acrylic polymer at different pH levels without precipitation of the calcium occurring. Each aqueous system studied was devoid of phosphorus additive. The results of these experiments and the systems used therein are summarized in the following table in which "Polymer" represents the acrylic acid polymer used (having a molecular weight of 2000), and the values shown for "Calcium" represent the quantities thereof in ppm (wt) that remained in solution in the respective aqueous systems.

TABLE

|  | Sample 1 | Sample 2 | Sample 3 |
| --- | --- | --- | --- |
| pH | 11.0 | 12.5 | 13.0 |
| Caustic soda | 0.01% | 0.05% | 0.5% |
| Carbonate | 80 ppm | 80 ppm | 80 ppm |
| Polymer | 10 ppm | 10 ppm | 10 ppm |
| Calcium | 80 ppm | 140 ppm | 200 ppm |

It can be seen from the data in the table that a significant increase in acrylic polymer performance occurred at high pH as compared to its performance at lower pH.

EXAMPLE II

A propylene chlorohydrin hydrolyzer unit was utilized in an actual continuous operation in order to assess experimentally the performance of an acrylic acid polymer as the sole scale deposit inhibitor. For many years the hydrolysis operation conducted in this unit had been conducted using scale inhibitor blends of polymer and phosphorus additive-containing systems. Results had been acceptable with an average run time of 90 days before shutting down to clean scale deposits from the hydrolyzer. In the experiment, a 10 ppm (wt) solution of polyacrylic acid was used as the sole scale deposit inhibitor in the operation which was otherwise conducted in its customary manner. After 132 days of continuous operation, the hydrolyzer was shut down and opened for inspection. It was found to be completely free of any deposition. Accordingly the unit was returned to service without cleaning. The unit continues to run without cleaning after 180 days of continuous operation. It was also found that by use of this invention, the unit can operate with less steam, and at higher production rates because it remains clean. It is clear therefore that use of an acrylic acid polymer as the sole scale inhibitor in a chlorohydrin hydrolyzer gives dramatic improvements as compared to the previous application of polymer and phosphorus additive-containing systems.

While this invention has been described with reference to inhibiting scale in propylene chlorohydrin hydrolyzer units, the invention is deemed equally applicable to operations involving hydrolysis of other halohydrins to produce other epoxides, such as ethylene oxide, butylene oxide, and the like. This invention is susceptible to variation in its practice. Therefore the foregoing description is not intended to limit, and should not be construed as limiting, the invention solely to the particular forms of the invention described with reference to the Examples or Drawing. Rather, what is intended to be covered is as set forth in the ensuing claims and the equivalents thereof permitted as a matter of law.

What is claimed is:

1. A method of inhibiting scale formation in a chlorohydrin hydrolyzer unit, which method comprises introducing into an aqueous, alkaline chlorohydrin hydrolysis reaction mixture, a scale-inhibiting amount of a water-soluble polymer of acrylic acid having a weight average molecular weight in the range of about 1000 to about 5000, and maintaining said reaction mixture free of phosphorus-containing components, said amount of said polymer being effective to prevent scale deposition after operation of said hydrolyzer unit for a period of time which would require shut down for scale cleaning if operated in the presence of an acrylic polymer/phosphorus-containing scale inhibitor during said period of time.

2. A method in accordance with claim 1 wherein said scale-inhibiting amount is in the range of about 3 to about 50 ppm (wt).

3. A method in accordance with claim 1 wherein the water-soluble polymer of acrylic acid has a weight average molecular weight in the range of about 1800 to about 2200.

4. A method in accordance with claim 1 wherein the water-soluble polymer of acrylic acid is introduced into said reaction mixture as a water-soluble salt thereof.

5. A method in accordance with claim 1 wherein the reaction mixture has a pH above 12, and is maintained at a temperature above about 85° C.

6. A method in accordance with claim 1 wherein caustic soda is used to provide the alkalinity of said reaction mixture.

7. A method in accordance with claim 1 wherein lime is used to provide the alkalinity of said reaction mixture.

8. A method in accordance with claim 1 wherein the reaction mixture in said hydrolyzer is formed by feeding thereto an aqueous feed mixture formed from propylene chlorohydrin, water, caustic soda or lime, and said polymer of acrylic acid.

9. A method in accordance with claim 8 wherein said aqueous feed mixture is formed by mixing said polymer of acrylic acid with an aqueous solution of caustic soda or lime, and mixing the resulting aqueous mixture with a mixture of propylene chlorohydrin and water.

10. A method in accordance with claim 1 wherein said scale-inhibiting amount is in the range of about 3 to about 30 ppm (wt), wherein the water-soluble polymer of acrylic acid has a weight average molecular weight in the range of about 1800 to about 2200, and wherein the water-soluble polymer of acrylic acid is introduced into said reaction mixture as a water-soluble salt thereof.

11. A method in accordance with claim 10 wherein the reaction mixture has a pH above 12, and is maintained at a temperature above about 85° C.

12. A method in accordance with claim 11 wherein caustic soda is used to provide the alkalinity of said reaction mixture.

13. A method in accordance with claim 12 wherein the water-soluble polymer of acrylic acid has a weight average molecular weight of about 2000.

14. A method of inhibiting the formation of scale in a reactor in which a mixture of (a) propylene chlorohydrin, (b) caustic soda or lime, and (c) water, the mixture having a pH above 12, is being heated to a temperature above 85° C. to produce propylene oxide, which method comprises including in said mixture a scale-inhibiting amount of a water-soluble polymer of acrylic acid having a weight average molecular weight in the range of about 1000 to about 5000, and excluding from said mixture any phosphorus-containing additive component, said amount of said polymer being effective to prevent scale deposition after operation of said reactor for a period of time which would require shut down for scale cleaning if operated in the presence of an acrylic polymer/phosphorus-containing scale inhibitor during said period of time.

15. A method in accordance with claim 14 wherein the water-soluble polymer of acrylic acid has a weight average molecular weight in the range of about 1800 to about 2200.

16. A method in accordance with claim 14 wherein the water-soluble polymer of acrylic acid has a weight average molecular weight of about 2000.

17. A method in accordance with claim 14 wherein (b) is caustic soda.

18. A process for the production of propylene oxide by hydrolysis of propylene chlorohydrin in an aqueous alkaline reaction medium having a pH above 12 and a temperature of at least about 85° C., in which said hydrolysis is conducted in a reactor in the presence of a scale-inhibiting amount of a scale inhibitor added as a water-soluble polymer of acrylic acid having a weight average molecular weight in the range of about 1000 to about 5000, and in the absence of any phosphorus-containing additive component, said amount of said polymer being effective to prevent scale deposition after operation of said reactor for a period of time which would require shut down for scale cleaning if operated in the presence of an acrylic polymer/phosphorus-containing scale inhibitor during said period of time.

19. A method in accordance with claim 18 wherein said weight average molecular weight is in the range of about 1800 to about 2200.

20. A method in accordance with claim 18 wherein said scale-inhibiting amount is in the range of about 3 to about 30 ppm (wt).

21. A method in accordance with claim 1 wherein said water-soluble polymer of acrylic acid is maintained at or above a temperature of about 50° F. as said water-soluble polymer of acrylic acid is being introduced into said reaction mixture.

22. A method in accordance with claim 8 wherein said water-soluble polymer of acrylic acid is maintained at or above a temperature of about 50° F. as said water-soluble polymer of acrylic acid is being introduced into said reaction mixture.

23. A method in accordance with claim 9 wherein said water-soluble polymer of acrylic acid is maintained at or above a temperature of about 50° F. as said water-soluble polymer of acrylic acid is being introduced into said reaction mixture.

24. A method in accordance with claim 14 wherein said water-soluble polymer of acrylic acid is maintained at or above a temperature of about 50° F. as said water-soluble polymer of acrylic acid is being introduced into said reaction mixture.

25. A method in accordance with claim 18 wherein said water-soluble polymer of acrylic acid is maintained at or above a temperature of about 50° F. as said water-soluble polymer of acrylic acid is being introduced into said reaction mixture.

* * * * *